United States Patent Office 3,526,079
Patented Sept. 1, 1970

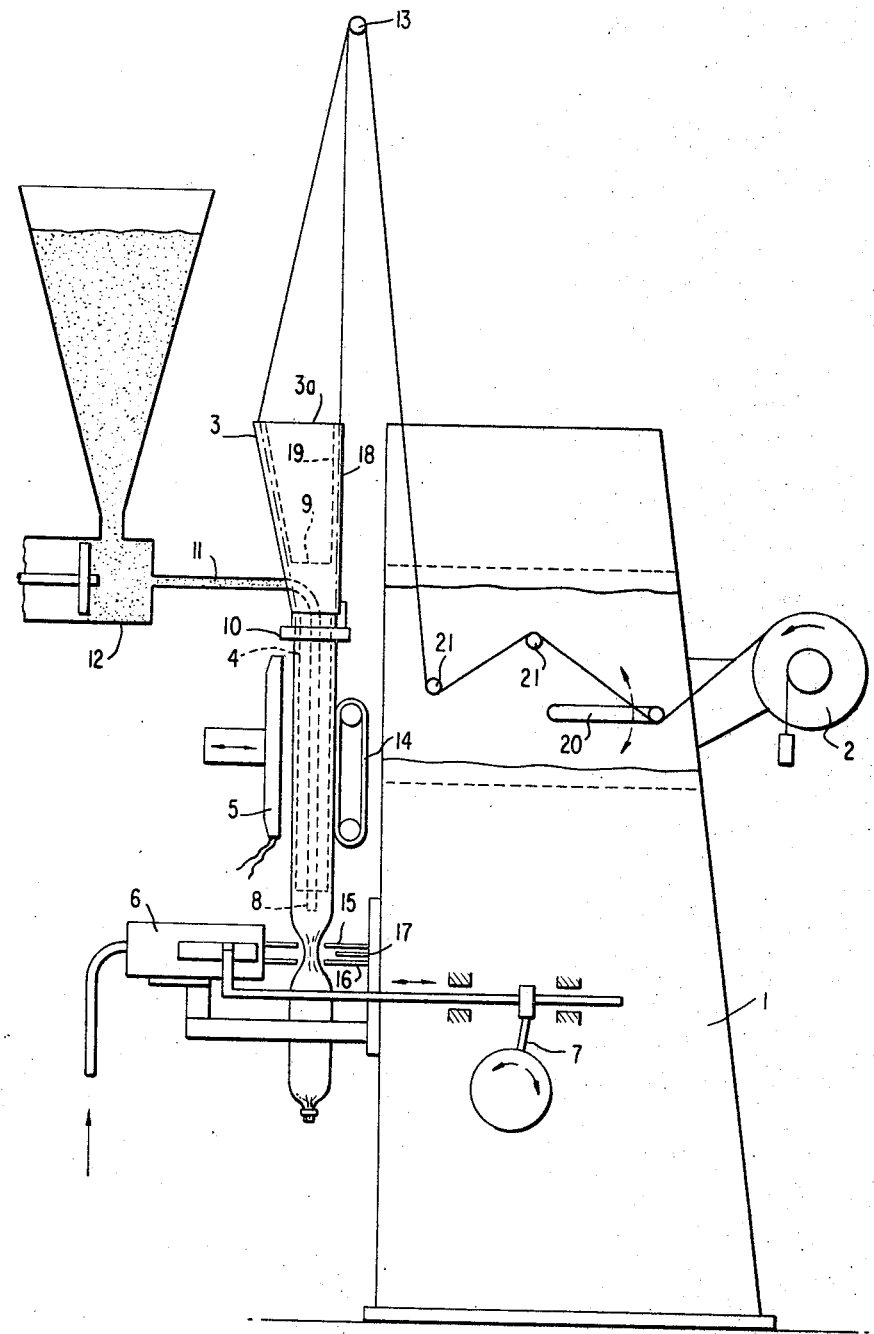

3,526,079
APPARATUS FOR THE CONTINUOUS PRODUCTION OF TUBULAR PACKAGES
Wilhelm Günther Maxeiner, deceased, late of Wiesbaden-Biebrich, Germany, by Minna Martha Karola Maxeiner, nee Martin, Brigitte Maxeiner, and Jutta Maxeiner, heirs, and Gerhard Schönbach, Wiesbaden-Biebrich, and Georg Trzeciak and Gerd Hohl, Wiesbaden-Schierstein, Germany, assignors to Kalle Aktiengesellschaft, Wiesbaden-Biebrich, Germany, a corporation of Germany
Filed Nov. 7, 1967, Ser. No. 681,293
Claims priority, application Germany, Nov. 9, 1966, K 60,665
Int. Cl. B65b 9/12
U.S. Cl. 53—180         6 Claims

ABSTRACT OF THE DISCLOSURE

This invention relates to apparatus for the continuous production of filled tubes from a film web which is thermoplastic on both surfaces, which comprises means for advancing the web downwardly, converting the web from a flat to a tubular form, interrupting the advancement of the tube and forming two transverse seals in the tube, severing the tube between the seals and welding the edges of the web together, and filling a desired product into the tube upon further advancement of the latter.

---

This invention relates to a process and an apparatus for the continuous production of tubular packages from a film web which is thermoplastic on both surfaces. Similar processes and apparatuses are known and in the known processes, the continuous production of a tube from a film web is followed by filling the tube with a product and dividing it into separate tubular packages.

A process of this kind is known in which the film web, while being longitudinally advanced, is converted from the flat form, by means of a so-called forming shoulder, into a tubular curved form with overlapping edges and transformed into a vertically positioned round tube by welding the web edges. At equal distances, the tube is then provided with two transverse seals, viz. welding seams, one closely above the other, then severed between the two transverse seals and the tube portion above the upper transverse seal is filled with a quantity of a product, the quantity and the distance at which the tube is provided with the two transverse seals being so determined that, between an upper transverse seal and the subsequently made lower transverse seal, the quantity of product filled in every time is enclosed in the tube. This process is useful for many purposes; but it has proved disadvantageous for the production of tubular packages where the product is pasty and thus must be pressed into the tube under a certain pressure in order to achieve a practically useful rate of production, partly bceause the transverse welding seams cannot be made due to the pasty nature of the product, and partly because the transverse seals do not have the desired strength owing to the pressure exerted during the filling operation. Further, when using thicker and stiffer film webs, the package cannot be satisfactorily tightly sealed.

The present invention overcomes the above-described drawbacks of the process for the production of tubular packages containing pasty products. The process according to the invention is performed in the above-described manner, but with the difference that, in addition, the film web while being advanced in a downward straight-line motion is converted from the flat into the tubular curved form, the two transverse seals are made by shirring and tying the tube twice while the longitudinal advancement of the film web is interrupted, the product is pressed into the tube during the longitudinal advancement thereof to such an extent as new tubular filling space is provided during the longitudinal advancement of the film web, and the web edges advantageously are welded together during the interruption of the longitudinal advancement of the film web.

Whereas in the known processes the film web, during the transformation into a tube, is converted from the planar, flat form directly into the pronounced curved form and then very soon into the round tubular form, bending of the film web in the process of the present invention is performed gradually. Partcicularly while bending the film web to the open half-round form, the tube covers a considerable distance in its longitudinal advancement. The distance covered by the film web until it is bent into the half-round form advantageously is at least double its width, preferably at least four times its width. The "open half-round" form means every preliminary position of the film web during conversion into the tubular form, in which position the film web is bent to such an extent that the two edges of the film web point in the same direction at places opposite to each other. The half-round form must not necessarily be circular; it also may represent an elliptical curvature or another curved form.

Curving of the film web preferably is performed in a manner such that the film web preliminary is converted into such an open half-round form that the axis directed to the opening is greater than the diameter of the tube to be made. The "axis directed to the opening" means the connecting line which connects the center between the two edges of the film web with the center of the film web. The open half-round form preliminary developed during conversion of the film web into the tubular form advantageously is an open semi-circle, the size of the axis directed to the opening being equal to the sum of the diameter and the third part of the longitudinal seam overlap of the tube to be made.

During conversion of the film web from the flat into the tubular curved form, according to the process of the present invention, the film web is moved in a substantially vertical direction downwardly. This preferably is carried out so that the middle of the film web during conversion from the flat to the tubular curved form is conveyed in a straight path downwardly.

The two transverse seals by means of which in the course of the present process the upper closure of a tubular package and the lower closure of the following package are formed, are made in a known manner by shirring and tying the tube twice, the longitudinal advancement of the film web being interrupted, however. Tying may be performed by means of a string or a metal wire. The latter represents the preferable method of tying; it is generally called clipping. While the two transverse seals are made the film web is simultaneously severed, in known manner, between the two transverse seals.

To the extent the film web is longitudinally advanced at regular intervals, new tubular filling space is provided, and to the extent the space is provided the filling product is pressed into the available filling space during the longitudinal advancement of the film web.

The welding of the edges of the film web, which is necessary for the formation of the tube, advantageously is performed when the longitudinal advancement is interrupted for the manufacture of the transverse seals and for severing between the two transverse seals.

The process permits the production of tubular packages in which the longitudinal seams and the transverse closures are very firmly and flawlessly sealed. The process of the invention thus allows, inter alia, to process gas-tight film webs in a flawless manner to produce tight tubular packages. Gas-tight film webs consist of several layers of different materials and thus have a certain stiffness which renders their processing into gas-tight packages particularly difficult. For the production of gas-tight packages, there is especially used a metal foil web, mainly an aluminium foil web, which is covered on each of its two surfaces with at least one layer of a synthetic plastic. Such film webs also can be flawlessly processed into gas-tight packages according to the present invention. One embodiment of the process according to the present invention thus comprises using a metallic foil web, provided with a thermoplastic layer on each side, for the production of the tube.

The apparatus described below which constitutes another feature of the present invention has proved very advantageous for the performance of the process according to the invention. The apparatus described in the following is an exemplary embodiment and is diagrammatically shown in the accompanying drawings.

Apparatuses for the continuous production of a tube from a film web which is thermoplastic on both surfaces and is moved in the longitudinal direction are known. They have means for straight guidance of the film, a drawing mold and a welding means for the production of the longitudinal seam of the tube. Furthermore, some of them have a stationary transporting device for longitudinally moving the web to be transformed as well as a closing and dividing device for dividing the formed tube into individual tubular packages. The drawing mold limits a part of the path of the film web in a manner such that the latter, when advancing longitudinally, is forced from the planar into the curved tubular form. Sometimes a cylindrical support is adjacent to the drawing mold, which support, during welding of the longitudinal seam of the tube, serves as a stop for the welding device and also for the transporting device. The cylindrical support further serves to fill the tube, often by means of a stuffing horn extending into the cylindrical support. The apparatus according to the present invention has the above-described elements and also the drawing mold is of such a shape and is so arranged with respect to the means for straight guidance of the film web that the path of the film web within which the latter is converted from the flat into the bent tubular form, extends downwardly and the closing and severing device, as is known, has two tying devices and a separating device operating between both tying devices.

In the exemplary embodiment of the apparatus according to the invention which is shown in the drawings, numeral 1 indicates the frame of the machine. The film web from which the tubular packages are produced is shown in the form of a film web roll 2 in a holder. During operation of the apparatus, the film web is continuously withdrawn from the roll 2. Since the longitudinal advancement of the film web is interrupted at regular intervals in that portion of the apparatus in which welding of the longitudinal seam and tying of the film web as well as filling in the product are performed, the film web first passes over a rocker arm 20 in order to obtain the change from the continuous to the discontinuous movement of the film web. The film web then passes over the two guide rolls 21 to the guide roll 13. The latter is the film web conveyor of the illustrated apparatus. The "film web conveyor" in the present invention means that portion of the apparatus over which the film web is guided straight for the last time before it is converted into the rounded tubular form. Below the film web conveyor there is the drawing mold by means of which the film web is converted from the flat into the rounded form. The cylindrical support 4 is adjacent to the drawing mold 3 and serves as a stop for the welding device 5 for welding the overlapping edges of the film web in order to form the longitudinal seam of the tube. The cylindrical support furthermore serves as a stop for the transporting device 14 for advancing the tube in the longitudinal direction of the film web. Below the cylindrical support there is the tying and severing device 6 which is operated by means of the drive 7. Filling of the tube is carried out by means of the stuffing horn 8 extending into the cylindrical support 4, preferably passing through the cylindrical support and projecting somewhat at the lower end thereof. The pasty product is forced into the feed pipe 11 by means of the pump 12 and, corresponding to the advancement stroke of the tube and in an appropriate predetermined quantity, is forced through the stuffing horn 8 into the tube advanced by the transporting device 14. The operating mechanism 7 of the tying and severing device, the transporting device 14, the welding device 5, and the metering pump 12 are controlled in known manner, not illustrated, so that the metering pump 12 is operated while the transporting device 14 advances the tube, and so that the tying and severing device 6 and the welding device 5 are operated while the transporting device 14 stands still.

The drawing mold preferably is of such a shape and is so positioned to the film web conveyor that that part of the apparatus in which, during conversion of the film web from the flat to the curved tubular form, conversion from the flat to the open half-round form is effected is at least six times as long as the outer diameter of the cylindrical support. In the exemplary embodiment shown in the figure, the drawing mold 3, in its upper part 3a through which the film web enters the drawing mold 3 is of a half-round shape open towards the left-hand side. When entering the drawing mold 3, the film web is thus forced into a half-round form open at the left-hand side. With such a design of the drawing mold, the distance between the upper edge 3a of the drawing mold and the film web conveyor 13 consequently is preferably at least six times as long as the diameter of the cylindrical support 4, e.g. fifteen or twenty times as long.

The drawing mold 3 has, in known manner, a curved wall 18 which serves to grasp the film web and is adjacent to the cylindrical support 4, having a circular cross-section the internal diameter of which is slightly larger than the outer diameter of the cylindrical support. Such a curved wall grasping the film web has proved very advantageous as a drawing mold. In order that the film web, when being grasped in the curved wall, does not curl or form creases, guiding elements are connected with the curved grasping wall, which elements bring the edges of the film web into contact with the grasping wall. Very practical is a drawing nozzle of the design shown in the drawings, the grasping wall 18 and a second wall 19 parallel thereto limiting a curved slot.

The lower end of the drawing mold 3 is adjacent and adapted to the cylindrical support 4. Since the grasping wall 18 encloses the film web during transformation and the cylindrical support 4 is enclosed by the film web, the internal diameter of the grasping wall 18 at the lower end of the drawing mold must be somewhat larger than the outer diameter of the cylindrical support 4, viz. by at least the double value of the width of the film web to be processed. In practice, the difference is not large and, advantageously has a value such that films of different thicknesses can be processed with the same drawing mold. Generally, however, the difference is not more than 2 mm. so that usually a circular passage of a width not more than 1 mm. is provided between the lower end of the drawing mold and the upper end of the cylindrical support. It has also proved practical to mount, at the upper part of the cylindrical support, a forming ring 10 which surrounds the cylindrical support at a distance of preferably not more than 1 mm.

The embodiment shown in the drawings furthermore shows the preferable arrangement in which the film web conveyor 13, the drawing mold 3, the cylindrical support 4, and the welding device 5 are so arranged that the longitudinal center line of the web can follow a straight vertical path.

As mentioned above, the stuffing horn 8 projects slightly from the lower end of the cylindrical support 4 and ends approximately three to four centimeters above the tying device. Furthermore, it is advantageous for the end of the support 4 to remain open, i.e. to be in free communication with the atmosphere surrounding the device. If required by the construction of the apparatus, this communication may be provided by an opening in the upper part of the cylindrical supporting pipe. The feed pipe 11 which leads from the metering pump to the stuffing horn 8 extends through the open side of the film web, not yet completely bent to form a tube, into the interior of the rounded film web. The lower end 9 of the inner wall 19 of the drawing mold is above the place at which the connection between the pump and stuffing horn 8 extends into the interior of the rounded film web.

The closing and severing device 6 has an upper shirring and tying device 15, a lower shirring and tying device 16 and a severing device 17. Such combined shirring, tying, and severing devices are known so they are not described in detail. The tying devices preferably are so-called clipping devices; such devices are known. The tying and severing device is stationary and, in accordance with the invention, does not serve to advance the film web. For this purpose, a transporting device 14 is provided which, together with the support 4 as a stop, serves to transport the film web. The transporting device may be an endless conveyor belt; preferably at least two are provided. For the sake of simplicity, the figure shows only one such conveyor belt. Transporting rolls also are suitable transporting means.

The welding device provided for welding the longitudinal seam of the tube may be a constantly heated or impulse-heated welding device and, provided the film material used allows it, also a high-frequency welding device. Such welding devices are known and are not described in detail. The same applies to the metering filling devices, and here also, pumps in the form of piston pumps and screw pumps are known, but it should be noted that it has proved advantageous to use such a pump of known construction which produces a resuction at the end of every metering filling stroke. Such pumps have hitherto been used in cases where, by a flowable property of the product, there was a risk of irregularly metering the quantity of product. Since the present invention deals with the filling of tubular packages with a pasty product, in which case flow of the product is not to be expected because of its pasty nature, it should be noted that employing a resuction pump is of advantage which becomes apparent in that bursting of the packages during tying of the tubular packages occurs less often than when using metering pumps which can not produce resuction.

Using the apparatus of the invention it is possible for the first time to produce gas-tight packages with high security, the packaging material being a film having a certain stiffness. This particularly applies to tubular packages made from an aluminum foil provided with a thermoplastic coating on each side. Packages produced with such a material and containing meat or sausage material as the pasty product have a long shelf life when stored in a cool place. It hitherto has not been possible to produce storable sausage packages fully automatically from such a film web.

It will be obvious to those skilled in the art that many modifications may be made within the scope of the present invention without departing from the spirit thereof, and the invention includes all such modifications.

What is claimed is:

1. An apparatus for the continuous production of filled tubes from a film web which is thermoplastic on both surfaces, which comprises means for advancing the web downwardly; cylindrical support means having forming means on the top thereof for converting the web from a flat to a tubular form, the forming means having a curved wall for shaping the film, a lower end of a diameter larger than that of the cylindrical support means and the upper end of the forming means being enlarged to a round shape in which half of the inner circumference is larger than the outer circumference of the cylindrical support means; means for interrupting the advancement of the tube; means for forming two transverse seals in the tube; means for severing the tube between the seals; means for welding the edges of the web together; and means for filling a desired product into the tube upon further advancement of the latter.

2. An apparatus according to claim 1 in which the forming means, the cylindrical support means, and the means for welding the edges of the web together are so arranged that the longitudinal center line of the web can follow a straight vertical path.

3. An apparatus according to claim 1 in which the forming means has a curved slot therein formed by the curved wall and a second wall parallel thereto.

4. An apparatus according to claim 3 in which the second wall extends above the means for filling a product into the tube.

5. An apparatus according to claim 1 including cylindrical forming ring means around the cylindrical support means at the upper end of the latter.

6. An apparatus according to claim 1 in which the cylindrical support means is open at the upper end thereof.

References Cited

UNITED STATES PATENTS

| | | | |
|---|---|---|---|
| 2,832,271 | 4/1958 | Järund | 93—82 |
| 3,008,278 | 11/1961 | McCalley | 53—182 |
| 3,055,731 | 9/1962 | Löliger. | |
| 3,149,447 | 9/1964 | Dorr | 53—180 |
| 3,173,233 | 3/1965 | Klein | 53—28 X |
| 3,354,601 | 11/1967 | Schneider et al. | 53—28 |

THERON E. CONDON, Primary Examiner

E. F. DESMOND, Assistant Examiner

U.S. Cl. X.R.

93—82